May 23, 1939.    R. H. ARNOLD ET AL    2,159,625
LIQUID DISPENSING APPARATUS
Filed Jan. 17, 1935    6 Sheets-Sheet 1

Inventors
Ross H. Arnold
William G. Polhamus
Howard Somervell
Attys:—

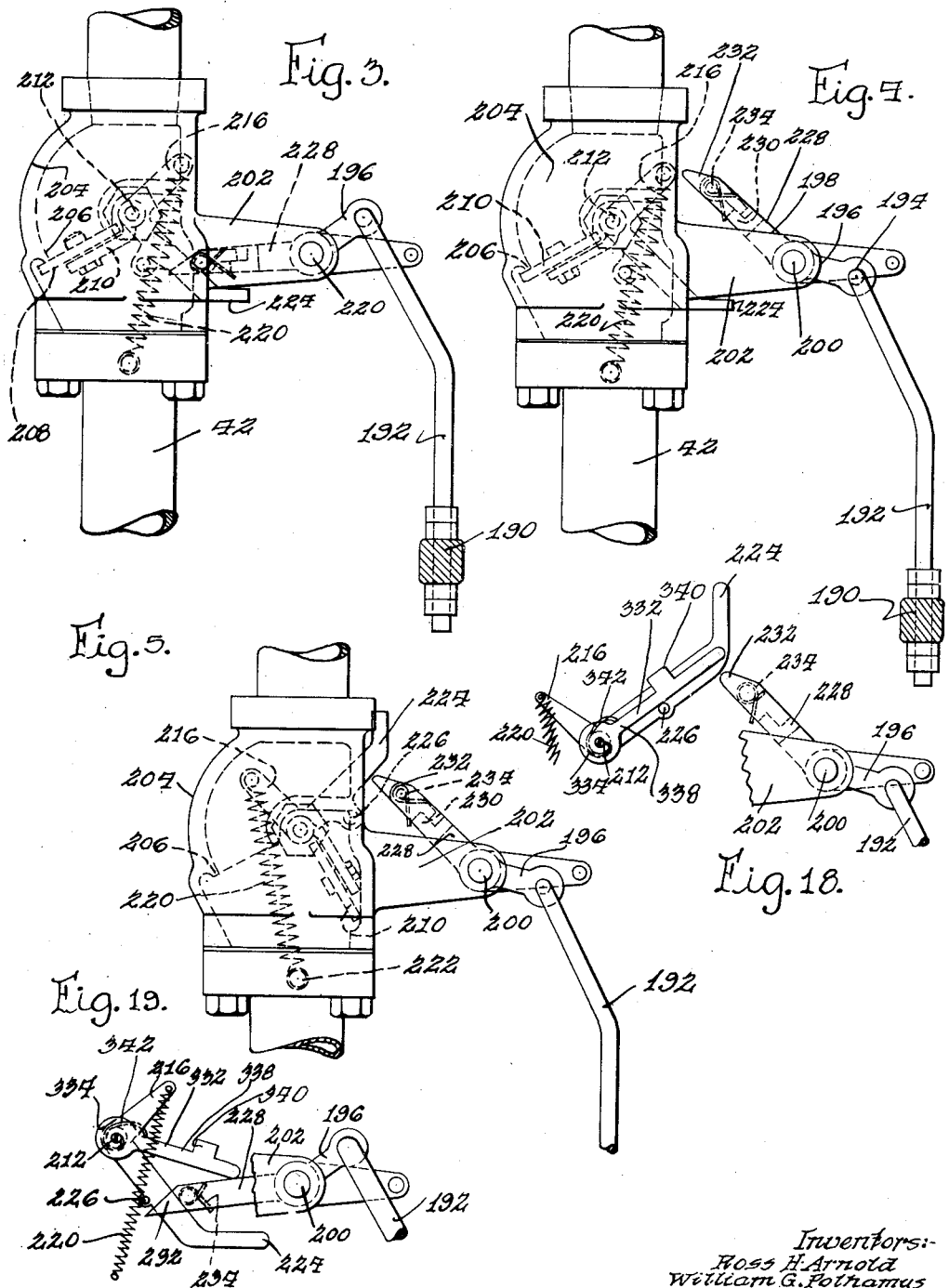

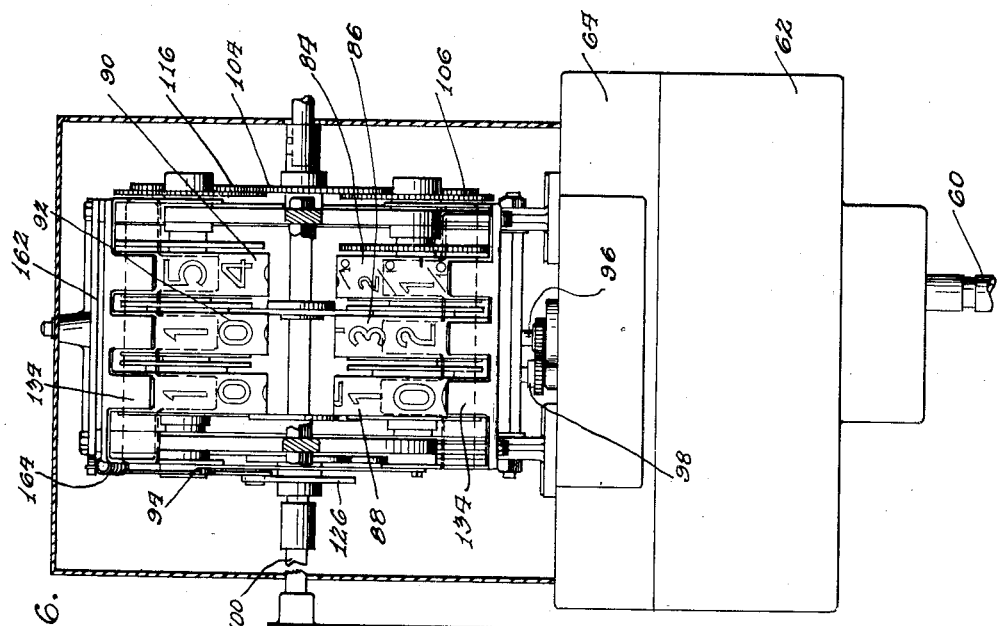
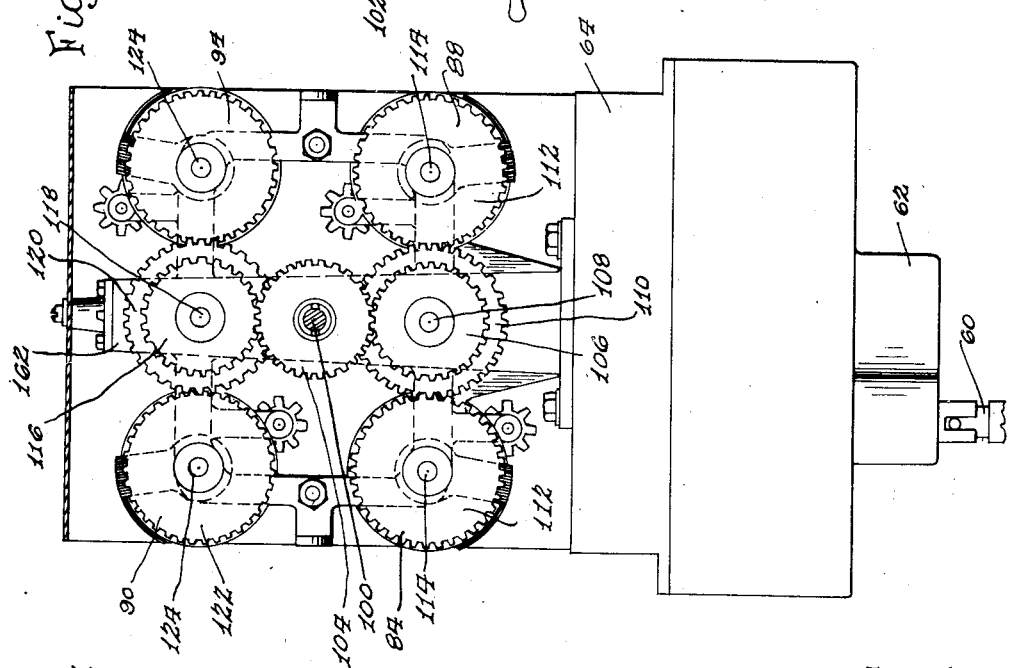

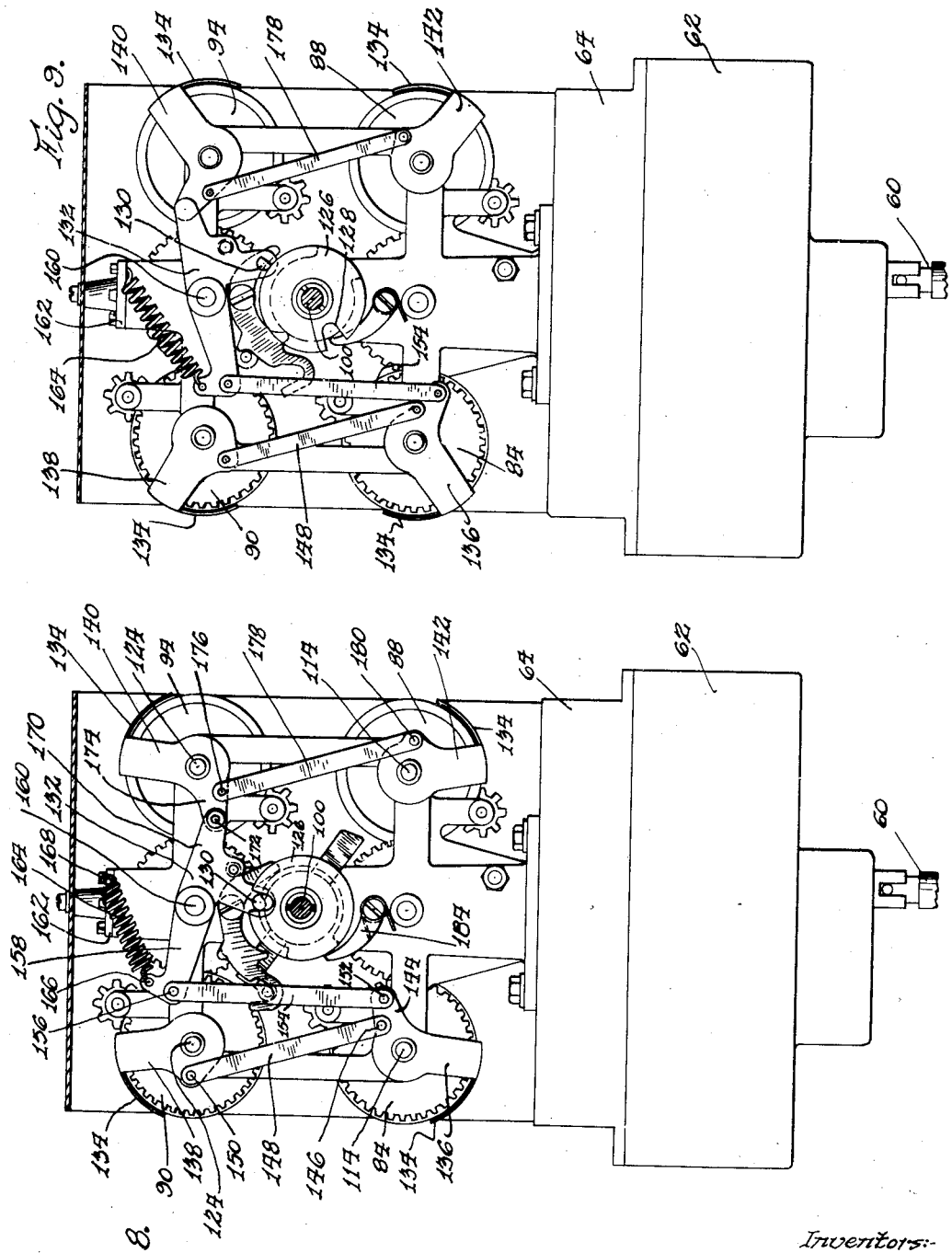

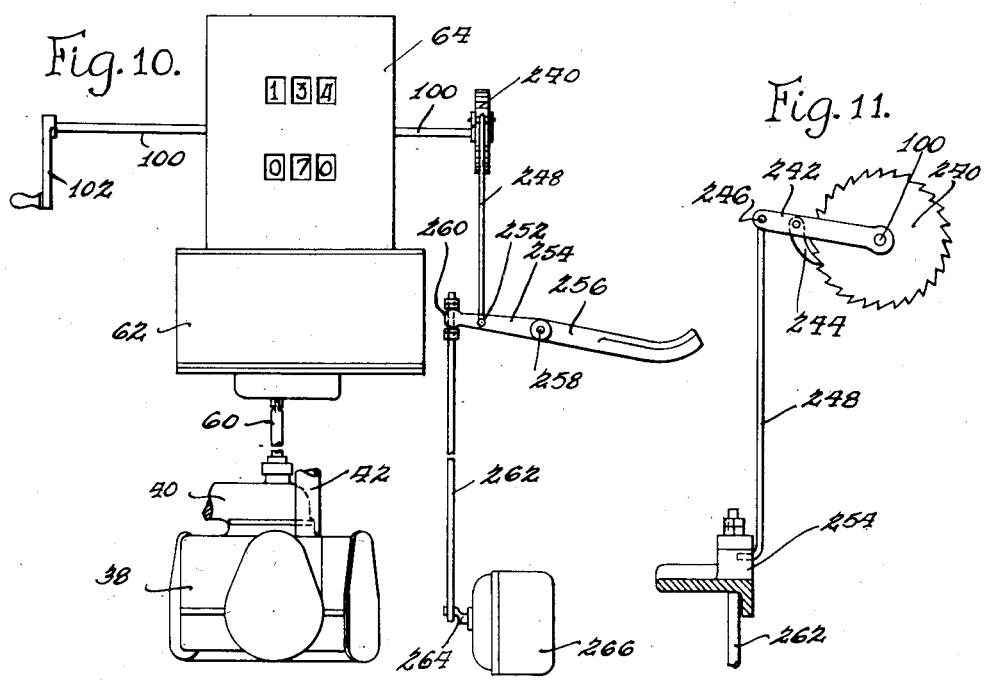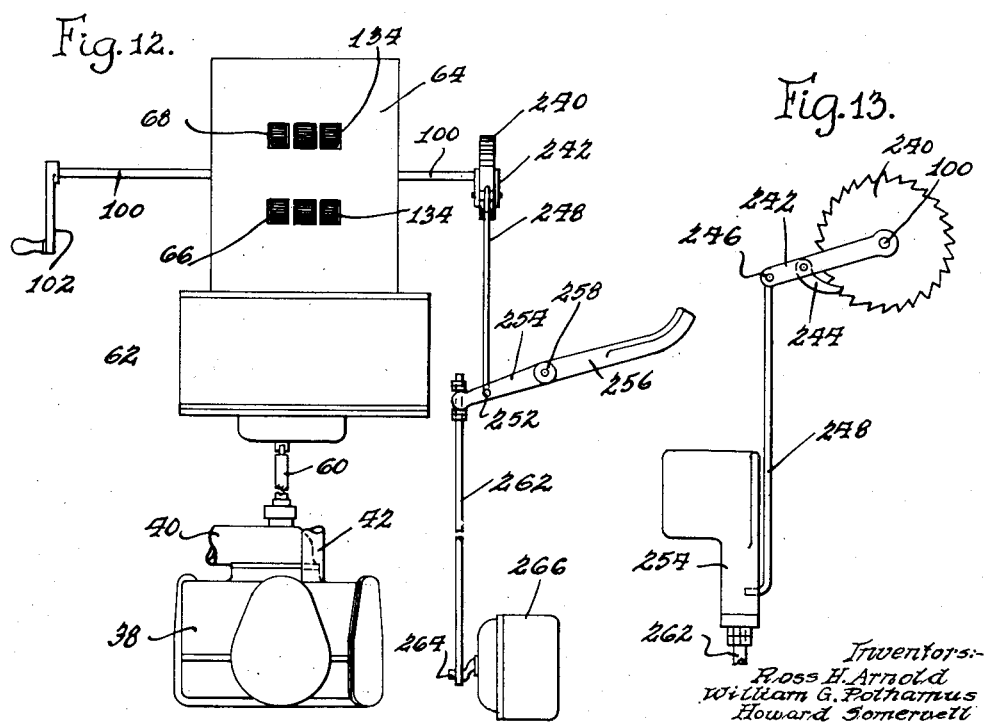

May 23, 1939.    R. H. ARNOLD ET AL    2,159,625
LIQUID DISPENSING APPARATUS
Filed Jan. 17, 1935    6 Sheets-Sheet 6
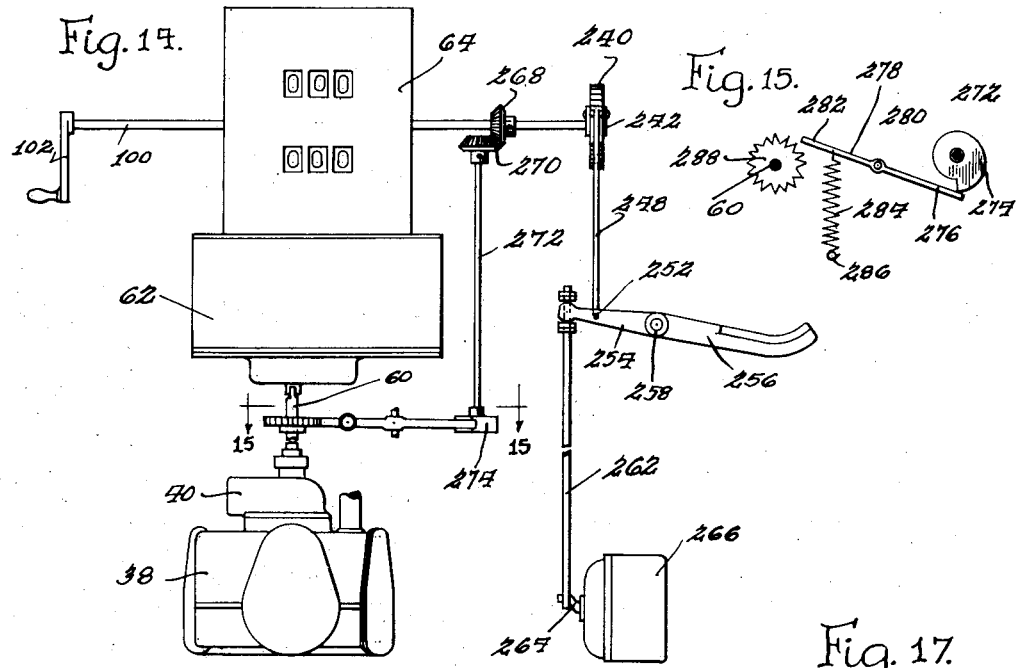
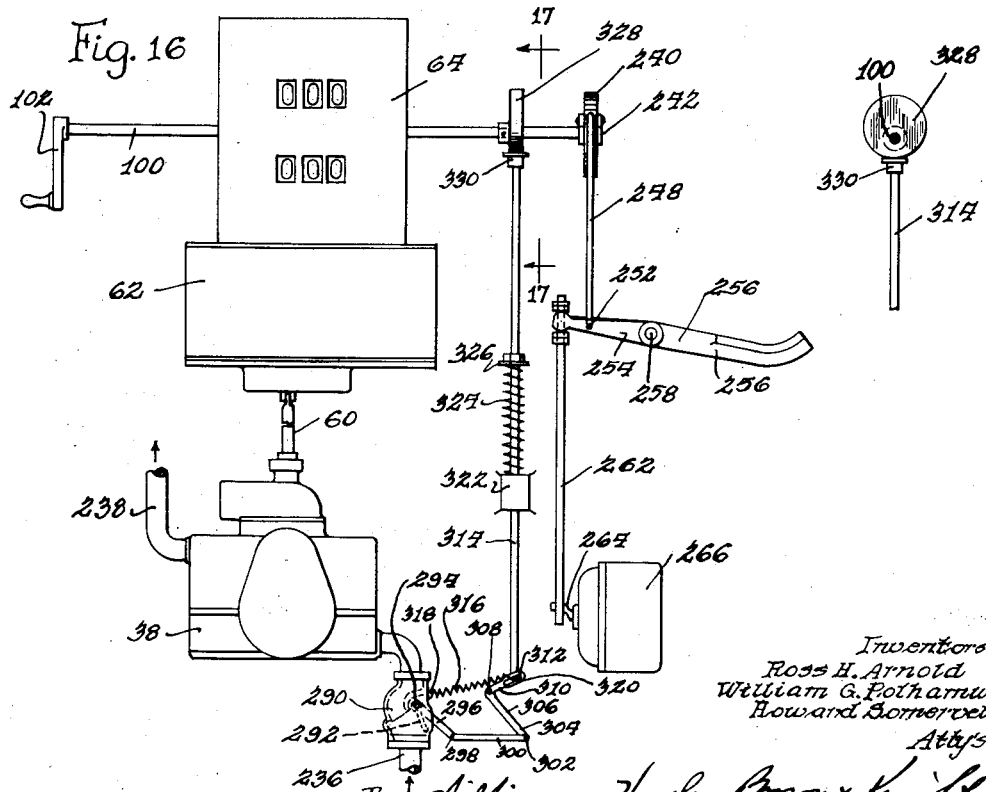

UNITED STATES PATENT OFFICE 2,159,625

LIQUID DISPENSING APPARATUS

Ross H. Arnold and William G. Polhamus, Fort Wayne, Ind., and Howard Somervell, Evanston, Ill., assignors to The Wayne Pump Company, Fort Wayne, Ind., a corporation of Maryland Application January 17, 1935, Serial No. 2,282

39 Claims. (Cl. 221—95)

This invention pertains to liquid dispensing apparatus.

It is an object of this invention to provide a liquid dispensing apparatus wherein indicating means must be set at zero before dispensing operation can occur.

Another object is to provide a liquid dispensing apparatus wherein, after an amount of liquid has been dispensed, it is necessary to reset the indicating means of the liquid dispensing apparatus to a predetermined position before an additional amount can be dispensed.

Still another object is to provide a liquid dispensing apparatus using the counter type of indicating mechanism wherein resetting occurs in the registering direction of said counters, and wherein means is provided for preventing dispensing from the liquid dispensing apparatus while the counter is being reset to zero.

A further object of the invention is to provide a liquid dispensing apparatus which is rendered inoperative even though the starting switch is closed until and unless the indicator is set at zero.

A yet further object of the invention is to provide a liquid dispensing apparatus wherein the indicator is rendered visibly inoperative until the indicator is set at zero.

A still further object of the invention is to provide a liquid dispensing apparatus wherein the meter is rendered inoperative until or unless the apparatus is set to a predetermined position.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts:

Figure 3 is an enlarged fragmentary elevation of a portion of the discharge pipe showing the valve control mechanism in closed position rendering the liquid dispensing apparatus inoperative, and wherein the switch control is indicated in the open position;

Figure 4 is a fragmentary elevation corresponding to Figure 3 showing the position of the mechanism wherein the control switch is in closed position;

Figure 5 is an enlarged fragmentary elevation corresponding to Figure 3 wherein the valve is shown in open position, that is, where dispensing operation may occur, the parts of the device indicating that the control switch is in closed position;

Figure 6 is an enlarged sectional elevation of the counter and variator mechanism adapted to be used in the liquid dispensing apparatus embodying the invention;

Figure 7 is an enlarged side elevation of the counter and variator mechanism illustrated in Figure 6 as viewed at the right of said figure, showing the gears necessary for resetting the device to zero;

Figure 8 is an enlarged side elevation taken at the left of Figure 6, the same showing the shutter control mechanism, the shutters in said figure being in open position or in normal position when liquid is to be dispensed from the liquid dispensing apparatus;

Figure 9 is an enlarged side elevation corresponding to Figure 8 showing the indicator mechanism in position with the shutters closed or in the position where resetting occurs;

Figure 10 is a fragmentary elevation showing a shutter control device for rendering the indicating mechanism inoperative until the indicator has been reset to zero, the same showing the switch in open position;

Figure 11 is an enlarged side elevation of the ratchet wheel control for a form of the device illustrated in Figure 10;

Figure 12 is a view corresponding to Figure 10 showing the shutter control in closed operation, and the switch in closed position;

Figure 13 is a view corresponding to Figure 11 but showing the ratchet in position where the shutters are in closed position;

Figure 14 is a view corresponding to Figure 10 showing still another modified form of the invention wherein a positive lock is provided for the indicator shaft;

Figure 15 is an enlarged plan partly in section of positive lock control means for the device illustrated in Figure 14, the section being taken substantially in the plane indicated by the line 15—15 of Figure 14;

Figure 16 is a view corresponding to Figure 14 of yet another modified form of the device embodying the invention;

Figure 17 is a sectional elevation taken substantially in the plane indicated by line 17—17 of Figure 16;

Figure 18 is a fragmentary elevation of a modified form of valve operating mechanism corresponding to Figure 5 showing the valve in open position;

Figure 19 is a fragmentary elevation of the modification shown in Figure 18 showing the valve in closed position and the switch urged toward closed position.

Figure 1:
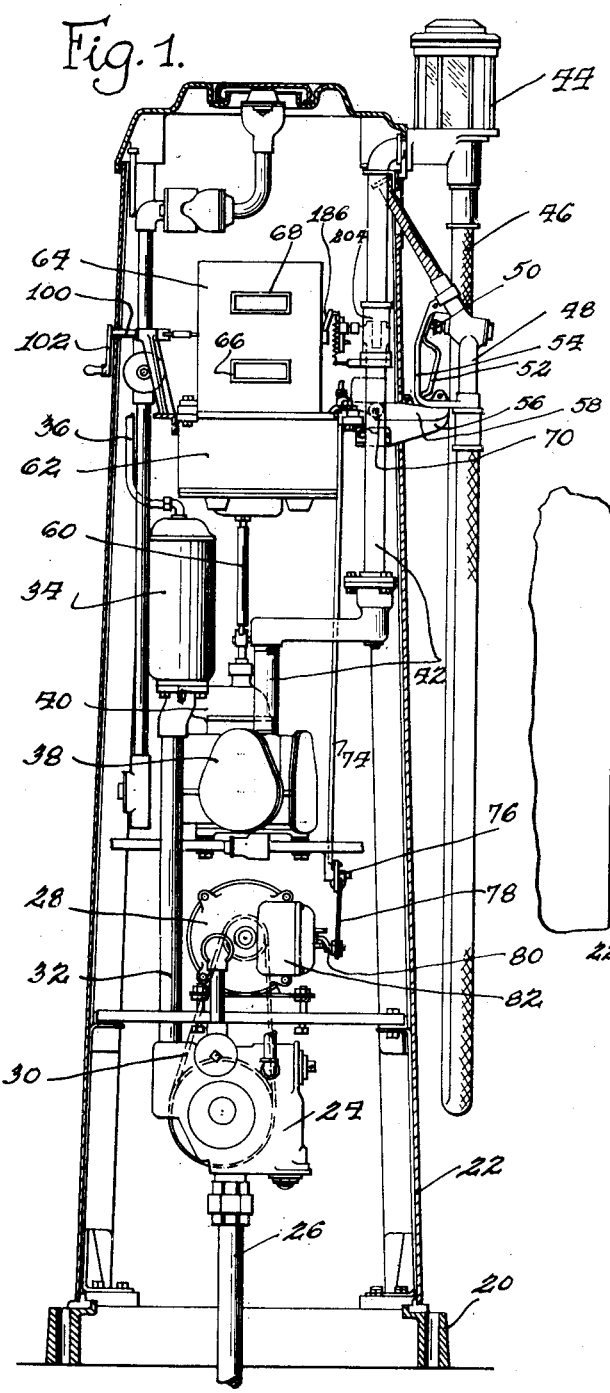
Figure 1 is a sectional elevation of a liquid dispensing apparatus having one form of means provided thereon whereby the counter or indicator must be set to zero before dispensing operation can occur.

Referring first of all more particularly to the form of device illustrated in Figures 1 to 5 inclusive, and to the indicator illustrated in Figures 6 to 9 inclusive, the liquid dispensing apparatus consists essentially of base 20 having secured thereto a casing or housing 22 within which is mounted the pump 24. The suction side of said pump is connected through the pipe 26 with a source of liquid supply (not shown), the pump illustrated being adapted to be operated by means of the electric motor 28 connected to said pump by means of a belt 30. The outlet side of the pump is connected through the pipe 32 with the air separator 34, said air separator having the vapor outlet 36 and being connected to the inlet side of the meter 38 as at 40. The outlet side of the meter is connected through the piping 42 with the sight gauge 44 to which is connected the hose 46, the end of the hose being provided with the discharge nozzle 48, flow through the nozzle being controlled by means of valve 50 and control lever 52 disposed within the guard 54.

The hose in inoperative position is adapted to be supported through the guard 54 on the fixed support 56 and in supported position is adapted to render the switch control member 58 inoperative, that is, incapable of being moved upwardly. The meter 38, which as shown is of the displacement type, is provided with the rotatable meter shaft 60 adapted to be rotated by the liquid passing through the meter, said shaft being coupled to the speed variator mechanism disposed in the housing 62 of the indicator 64. The speed variator mechanism is adapted to be used with the computing type of pump particularly shown and described in application Serial No. 628,868, Edward A. Slye, filed August 15, 1932. The indicator is provided with windows 66 and 68 having disposed therein suitable numeral wheels such as to be later described indicating the amount of liquid dispensed and the price of said liquid respectively.

The switch control member 58 is pivoted as at 70 and is provided with the inwardly extending arm 72 connected to the rod 74 which rod is connected through the lever 76 with the rod 78 which in turn is operatively connected to the switch member 80 of the control switch 82, said control switch being for the purpose of operating the motor 28. When the switch member 58 is in lowered position such as illustrated in Figure 1, the switch 82 is in open position and the motor is inoperative and in order therefore to dispense liquid assuming the indicator to be in the zero position, it is first necessary to remove the nozzle from its stationary support 56. The member 58 may then be moved upwardly to close switch 82 to start the motor and consequently to start the pump.

Liquid is drawn from the source of liquid supply through the pipe 26, and is forced by pump 24 to the meter 38, through the pipe 32. Operation of the nozzle valve 50 by means of the lever 52 permits liquid to pass through the meter 38 causing rotation of the shaft 60, the movement of the shaft being proportional to the liquid passing through the meter and consequently to the liquid discharged, thus causing the amount of said liquid to be shown in the window 66 and the cost of said liquid to be computed by the variator 62 and indicated in the window 68.

The operation of the variator 62 and the indicator 64 by the meter is accomplished as described in the aforementioned application. The indicator is of the conventional construction used in applicants' assignee's computing pump and consists essentially of amount indicating wheels 84, 86 and 88 disposed in the lower window and on each side of the liquid dispensing apparatus, said numeral wheels indicating tenths, units and tens of units dispensed, as for example, gallons. Complete rotation of the lower valued numeral wheels serves to operate the succeeding numeral wheel through one unit, for example, a complete rotation of the numeral wheel 84 serves to operate the numeral wheel 86 through one unit of movement, that is a tenth of a revolution.

The cost numeral wheels are disposed in the upper window on each side of the apparatus and consist of the numeral wheels 90, 92 and 94 indicating cents, tens of cents and dollars, respectively, the operation of such numeral wheels being similar to the operation of the amount numeral wheels, that is, rotation of a lower valued price wheel through a complete revolution serves to move the succeeding numeral wheel through one tenth of a revolution thereof. The amount and price numeral wheels are adapted to be operated by means of the shafts 96 and 98, all as described in said above referred to application.

In order to reset the indicator 64, the reset shaft 100 is provided having a reset crank 102 on the end thereof. Said reset shaft on one side thereof is provided with the gear 104 meshing with gear 106 mounted on shaft 108. Gear 106 is non-rotatably provided with the gear 110 meshing with gears 112 non-rotatably mounted on the shafts 114 of the amount indicating wheels. The gear 104 likewise meshes with gear 116 mounted on the shaft 118, gear 116 being provided with the gear 120. The gear 120 meshes with gears 122 non-rotatably mounted on shafts 124 on which the cost indicating wheels are mounted. At the opposite side of the indicator, as shown in Figures 8 and 9, the shaft 100 is provided with the disk 126, non-rotatably mounted thereon, said disk being provided with a notch 128 disposed to receive the pin 130 of the lever 132 when the shaft 100 mounted on the lever 132 when the shaft 100 is in a position wherein the numeral wheels indicating both price and amount are disposed at zero.

In the indicator shown, resetting of the numeral wheels is in the direction of registration, that is, rotation of the shaft 100 by the lever 102 causes rotation of the shafts 114 and 124 by the gear 104 and gears 106 and 116 and 112 and 122, so that the numeral wheels are picked up in the normal direction of registration of said numeral wheels. In order therefore to provide means for preventing visible operation of the indicator, shutters 134 are provided. Said shutters are disposed adjacent each numeral wheel and are pivotally mounted by means of the frame members 136, 138, 140 and 142 on the shafts 114 and 124. The frame member 136 is provided with the arm 144 which is pivotally connected as at 146 to the link 148, the other end of which is connected as at 150, to the frame 138.

The arm 144 is also pivotally connected as at 152, to the link 154 which is pivotally connected at its other end as at 156 to the arm 158 of the member 132, said member being pivoted as at 160 to the frame or support 162 of the indicator, the arm 158 being normally urged in a clockwise direction by means of the contractile spring 164 secured to said arm as at 166 and to the support 162 as at 168. The member 132 is provided with the portion 170 having the pin 130 thereon, and likewise pivotally connected as at 172 to the arm 174 of the frame 140. The arm 174 is pivotally connected as at 176 to the link 178 the other end of which is pivotally connected as at 180 to the frame 142. A spring pressed pawl 184 is provided adapted to engage shoulders on the member 126 for preventing reverse operation thereof until the shutters fall and then backward rotation of the numeral wheels is prevented by a clutch (not shown) interposed between the shaft 100 and the numeral wheels.

It will thus be seen that rotation of the shaft 100 causes the pin 130 to be moved out of the notch 128 to thereupon move the member 132 in a counterclockwise direction causing the shutters 134 to be dropped over their respective numeral wheels whereupon during resetting operation of the numeral wheels no visible indications can be seen in the windows 66 and 68 and the shutters will not be moved out of obstructing position by the spring 164 until the pin 130 registers with the notch 128 at which time the numeral wheels will all be reset to zero position.

In the embodiment of the invention illustrated in Figures 1 to 5 inclusive, the shaft 100 extends outwardly of the case of the indicator and is provided with the crank 186 having the pin 188 thereon. The switch control member 58 is provided with the arm 190 to which is secured a rod 192. The rod 192 extends upwardly and is pivotally connected as at 194 to the arm 196 of the lever 198, the lever 198 being pivotally connected as at 200 to the support 202 provided on the valve casing 204. The valve casing 204 is interposed in the pipe line 42 adjacent the indicator and within said casing there is provided the valve seat 206 which is adapted to be closed by the valve disk 208, said valve disk being provided on the pivoted member 210, mounted on the shaft 212, said shaft extending outwardly through a suitable stuffing box 214 and being provided with the external arm 216. The arm 216 is provided with the pin 218 to which is secured the contractile spring 220, the other end of said spring being anchored as at 222 to the valve housing, the arm 224 and anchor point 222 being so disposed with respect to dead center 212 that the valve is biased to open or closed position by means of the spring depending upon the position of said spring such as illustrated for example, in Figures 3 and 5.

Figure 2:
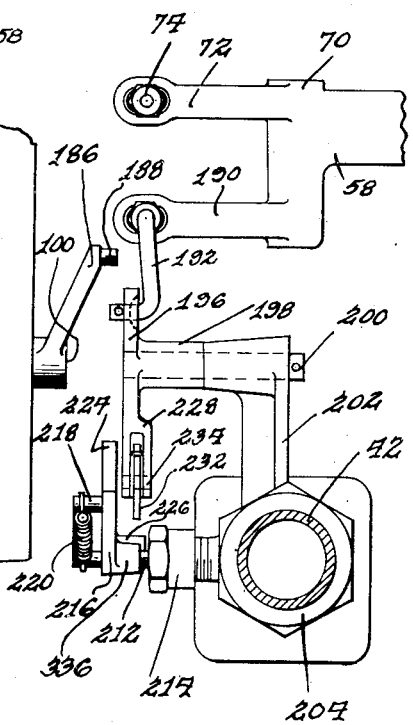
Figure 2 is an enlarged fragmentary plan of a portion of the counter, the switch control and the valve control mechanism forming one embodiment of the invention and such as illustrated in Figure 1.

The member 216 is also provided with the arm 224 set at substantially ninety degrees to the arm 216, said arm being provided with the pin 226. The member 198 is provided with the inwardly extending arm 228 provided with the shoulder 230 and having the spring pressed latch member 232 pivotally connected to said arm as at 234 and disposed in the plane of the pin 226. The latch member 232 normally engages the shoulder 230 so that as viewed in Figure 4, the latch member may move in a limited counterclockwise direction about the pivot 234 but cannot move in a clockwise direction. The pin 188 of crank 186 provided on the shaft 100 of the indicator is so located that it is coplanar with the member 224 such as shown in Figure 2.

In operation of this form of the device, assuming that the indicator 64 is in the zero position, and the valve disk 210 is in open position, it is necessary to remove the nozzle 48 from the support 56 and to raise the control member 58. Raising the control member 58 closes the switch 82 to start the motor, whereupon liquid may be dispensed by operation of the lever 52. After the desired amount of liquid has been dispensed and it is desired to render the apparatus inoperative, the member 58 is moved downwardly to open the switch 82. Movement of the member 58 downwardly causes the arm 190 to move upwardly causing counterclockwise movement of the member 198. This movement of member 198 causes the member 232 to engage the pin 226, whereupon the valve member 208 is moved until the spring 220 passes dead center 212 whereupon the valve will be snapped to closed position, thus preventing further flow of liquid through the pipe 42. In order then, further to dispense any liquid from the apparatus, it is necessary to operate the reset crank 102 to set the indicating device 64 to zero position as described above, during which setting the shutters are closed. When zero position is reached the shutters will be opened as described and in reaching zero position the crank 186 will have caused the pin 188 to contact the member 224 to rotate the member 224 in a counterclockwise direction about the pivot 212 to cause the valve 208 to be moved toward open position, the spring 220 snapping the valve to open position after it has passed dead center 212. The apparatus will then be in a position to dispense further liquid.

It is to be noted that the switch 82 may be moved to open or closed position at will, for, if the valve is in closed position as viewed in Figures 3 and 4 the member 228 may readily be moved upwardly from the position indicated in Figure 3 to that illustrated in Figure 4. Or in the event that the valve is in open position after the indicator has been reset, then member 228 may readily be moved as illustrated in Figure 5, as the spring pressed latch member 232 will readily pass the pin 226 by virtue of its pivotal connection 234 but in no case can the switch be closed having once been opened without closing the valve thus insuring that the indicator will be reset to zero before further amounts can be dispensed so that no customer can purchase liquid and pay for liquid already dispensed. Dispensing operation and computation thereof in all cases must be from the zero position of the indicator.

In the modification shown in Figures 18 and 19, a frame or lever member 332 may be journalled as at 334 on the boss 336 (Figure 2) of the member 216 or may be journalled on the shaft 212. The member 332 may consist of spaced arms 338 disposed on each side or in embracing relation to the member 224, the arms 338 being connected by the offset bridge 340 extending over the member 224 and either resting thereon, or the members 332 rest on the pin 226. As shown, a watch type spring 342 urges the member 332 toward the pin 226 and is stronger than the spring of the control switch. Though a watch type spring is shown, a coil spring may be used either connecting members 332 and 224, or connected to member 332 and anchored on a part of the liquid dispensing apparatus.

When the valve is open as shown in Figure 18 the member 224 raises the member 332 so that when the switch is closed to start the motor, the member 332 can never engage member 232, but when the valve is closed, i. e., where the member 224 is in the position shown in Figures 3, 4 and 19, the member 332 engages the member 232 and urges the member 228 in a counter-clockwise direction. Thus the switch can be opened or closed, but where the valve is closed the switch is opened unless held closed.

With this arrangement the motor cannot be left running, and also attention is directed to the closed position of the valve by the opening of the switch.

Referring now to the modification illustrated in Figures 10 to 17 inclusive, it is understood that the indicator 64 is similar to that already described, being provided with the variator 62 and being operated by the meter shaft 60, the liquid dispensing apparatus containing this indicator being the same as illustrated in Figure 1. In Figures 10 to 14 inclusive, the inlet to the meter 38 is shown at 40 and the outlet at 42. In the meter illustrated in Figure 16, a more diagrammatic form of inlet and outlet is shown for the sake of convenience, the inlet being shown at 236 and the outlet at 238.

Referring now more particularly to the forms of the device illustrated in Figures 10 to 15 inclusive, the reset shaft 100 is continued on the opposite side of the indicator from the reset crank 102 and is provided with the ratchet wheel 240. The lever 242 is pivoted to the shaft 100 and is provided with the pawl 244 adapted to have cooperative engagement with said ratchet wheel. The outer end of the lever 242 is pivotally connected as at 246 to the rod 248, said rod being pivotally connected as at 252 to the arm 254 of the switch control member 256 (similar to the switch control member 56) said member being pivoted as at 258 to the casing of the liquid dispensing apparatus. The arm 254 is connected as at 260 to the rod 262 which in turn is connected to the switch control arm 264 of the switch 266 corresponding to switch 82.

In the form of the device illustrated in Figures 14 and 15, the bevel or mitre gear 268 is provided on the projected reset shaft 100 adjacent the reset wheel 240 and meshes with bevel wheel 270 mounted on the shaft 272. The lower end of the shaft 272 is provided with a cam 274, said cam engaging the arm 276 of the lever 278, the lever being pivoted as at 280. The other arm 282 is provided with the contractile spring 284 anchored at 286.

The indicator shaft 60 is provided with the toothed locking gear 288 non-rotatably mounted thereon. The cam 274 is so disposed on the shaft 272 and the gears 270 and 268 are so related that the member 282 is maintained out of engagement with the locking gear 288 when the shutters 134 are raised in the windows 66 and 68, that is, when the numeral wheels are at zero position. After liquid has been dispensed movement of the switch control member 256 downwardly to open the switch 266 causes upward movement of the rod 248 moving the pawl 244 along a reset wheel 240. Then, when it is desired to dispense an additional amount, it is necessary to move the member 256 in a counterclockwise direction as viewed in Figure 10. This upward movement of this member causes downward movement of rod 248 and a partial movement of the reset wheel 240 by the pawl 244, thus causing a partial resetting movement of the shaft 100 sufficient to lower the shutters and in the form of the device illustrated in Figures 14 and 15 such partial movement permits sufficient movement of the cam 274 to cause the spring 284 to move member 278 in a counterclockwise direction thus causing engagement between the arm 282 and the locking gear 288 preventing rotation of the indicating shaft 60.

In the event liquid is dispensed in the device illustrated in Figures 10 and 13 no indication can be seen in the windows and the owner of the liquid dispensing apparatus will lose the amount of such dispensation. In order then, to clear the window for a sale with the motor in operation it is necessary to operate the reset crank 102 to reset the indicator to zero whereupon liquid may be dispensed, and in the form of the device illustrated in Figures 14 and 15, the reset indicator at zero causes the cam 274 to move the member 278 to disengage the arm 282 from the locking gear 288 whereupon a flow through the meter may occur as the indicating shaft 60 is released.

In the form of the device illustrated in Figures 16 and 17, the same ratchet form of mechanism 240 is provided as already described with respect to Figures 10 to 13 inclusive. In this form of the device, the inlet pipe 236 to the meter 38 is provided with the valve housing 290 in which the valve 292 is mounted, the valve 292 being mounted on the shaft 294 and provided with the external operating lever 296. This lever is connected as at 298 to the link 300. The other end of said link is pivotally connected as at 302 to the arm 304 of the bell crank 306, said bell crank being pivotally mounted as at 308 and having the other arm 310 thereof loosely connected as at 312 to the rod 314.

The biasing spring 316 is anchored at 318 at one end and is connected at the other end as at 320 to the arm 310 of the bell crank. Thus in open position the valve 292 is biased in open position by means of the spring. The rod 314 is guided as at 322 and normally maintained upwardly by means of the spring 324 disposed between the guide 322 and the member 326 mounted on said rod. The upper end of said rod engages the cam 328 through the follower 330, said cam being mounted on the reset shaft 100. While the valve 290 is shown as disposed in the inlet pipe 236 it is of course to be understood that it can be disposed in the outlet pipe 238.

In the operation of this form of device, after a predetermined amount of liquid has been dispensed, movement of the switch control member 256 to open the switch 266 has no effect upon the position of the indicator. When it is desired to dispense an additional amount, the member 256 is raised or moved in a counterclockwise direction to switch 266. This movement of the member 256 causes partial rotation of the shaft 100 through the pawl and ratchet wheel 240 whereupon the cam 238 depresses the rod 314 against the spring 324. This downward movement of the rod 314 causes the spring 316 to pass dead center 308 whereupon the valve 292 will be snapped closed so that no liquid can be forced to the meter or to the hose depending upon where the valve 290 is located. It is therefore necessary, as both the shutters have been closed, and the valve closed, to set the indicator 64 to zero by operation of the shaft 100 through the crank 102. In the zero position the cam 328 will be so disposed that the spring 324 will force upward movement of rod 314 to such an extent that the spring 316 will be biased upwardly of the pivot 308 to cause the valve 292 to be snapped to open position whereupon as both the indicator is at open position and the valve 290 is in open position, further dispensing operation can occur from the liquid dispensing apparatus.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing that flow of liquid has been effected through said meter, a control for starting and stopping operation of said pump, and valve means operative to open and closed position and disposed in said outlet pipe, said valve means being operative to one position by said control and to the other position by said indicator for preventing dispensing of liquid until said indicator has been set to a predetermined position after said control has been started and stopped and an amount of liquid has been dispensed.

2. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing that flow of liquid has been effected through said meter, a control for starting and stopping operation of said pump, and valve means operative to open and closed position and disposed in said outlet pipe, said valve means being operative to one position by said control and to the other position by said indicator for preventing dispensing of liquid until said indicator has been set to a predetermined position.

3. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing that flow of liquid has been effected through said meter, said indicator having reset means for returning said indicator to zero position, a control for starting and stopping operation of said pump, means including a valve associated with said control, said reset means and said outlet pipe for preventing flow through said pipe until said indicator is at zero position, said means having a member movable therewith for urging said control to stopping position when said valve is closed but disposed to be out of engagement with said control when said valve is open.

4. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus.

5. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus, said means including a ratchet wheel mounted on said reset shaft, a pawl connected to said control and associated with said ratchet wheel whereby movement of said control to start said pump operates said ratchet to close said shutter.

6. In liquid dispensing apparatus, the combination of a pump the suction side of which is adapted to be associated with a source of liquid supply a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, and means interposed between said control and said meter for rendering said meter inoperative until said indicator is reset to zero position.

7. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, said means including a ratchet wheel mounted on said reset shaft, a pawl connected to said control and associated with said ratchet wheel whereby movement of said control to start said pump operates said ratchet to close said shutter, and means interposed between said control and said meter for rendering said meter inoperative until said indicator is reset to zero position.

8. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, and means including a latch associated with said reset shaft and said meter for rendering said meter inoperative until said indicator has been reset to zero position.

9. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, said means including a ratchet wheel mounted on said reset shaft, a pawl connected to said control and associated with said ratchet wheel whereby movement of said control to start said pump operates said ratchet to close said shutter, and means including a latch associated with said reset shaft and said meter for rendering said meter inoperative until said indicator has been reset to zero position.

10. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, and valve means operable by said control for preventing liquid from being dispensed until said indicator is reset to zero position.

11. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, means associated with said control and said reset means for operating said shutter upon starting said control means whereby said indicator must be reset to zero for visible registration of liquid dispensed from said apparatus, and valve means in the connection between said pump and meter and operated by said control for preventing liquid from being dispensed until said indicator is set to zero position.

12. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus, and valve means operatively connected to said control and to said reset shaft whereby said control is adapted to close said valve means and said reset shaft is adapted to operate means to open said valve means under predetermined conditions.

13. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus, and valve means disposed in the connection between said pump and said meter and operatively connected to said control whereby operation of said control closes said valve means to prevent supply of liquid to said meter, said valve being operatively connected to said reset shaft whereby said valve means is opened when said indicator is reset to zero.

14. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by the meter for showing that flow of liquid has been effected through said meter, a shutter associated with said indicator, reset means for said indicator for returning said indicator to zero position, said reset means being operatively connected to said shutter whereby operation of said reset means to return said indicator to zero position causes said shutter to obstruct the visible registration of said indicator, a control for starting and stopping said pump, and means associated with said control and said reset means for operating said shutter upon starting said control means whereby said indicator must be reset to zero for visible registration of liquid dispensed from said apparatus, and valve means disposed in the connection between said pump and said meter and operatively connected to said control whereby operation of said control closes said valve means to prevent supply of liquid to said meter, said valve being operatively connected to said indicator whereby said valve means is opened when said indicator is reset to zero.

15. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve in said outlet pipe operated to open position by the reset means at the time the indicator is reset to a predetermined position, and means connected to said valve and operated by said control for closing said valve when said control is rendered inoperative.

16. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve for controlling discharge of liquid from said apparatus, said valve being operated to open position by the reset means at the time the indicator is reset to a predetermined position, and means connected to said valve and operated by said control for closing said valve when said control is rendered inoperative.

17. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve in said outlet pipe operated to open position by the reset means at the time the indicator is reset to a predetermined position, and means connected to said valve and operated by said control for closing said valve when said control is rendered inoperative, said control being operable at any time to start or stop said pump regardless of the position of said valve.

18. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve for controlling discharge of liquid from said apparatus, said valve being operated to open position by the reset means at the time the indicator is reset to a predetermined position, and means connected to said valve and operated by said control for closing said valve when said control is rendered inoperative, said control being operable at any time to start or stop said pump regardless of the position of said valve.

19. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve for controlling discharge of liquid from said apparatus, said valve having an arm for controlling movement thereof, an arm operable by said control for moving said first named arm to cause said valve to be closed when said control is rendered inoperative, said second named arm being inoperative to move said first arm when said valve is closed, and a member movable by said reset means engageable with said first named arm when the valve is in closed position to move said arm to open said valve when said indicator is reset to zero position.

20. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve for controlling discharge of liquid from said apparatus, said valve having an arm for controlling movement thereof, an arm operable by said control for moving said first named arm to cause said valve to be closed when said control is rendered inoperative, said second named arm being inoperative to move said first arm when said valve is closed, a member movable by said reset means engageable with said first named arm when the valve is in closed position to move said arm to open said valve when said indicator is reset to zero position, and a member engageable with said second named arm when said valve is closed to urge said second arm to move said control to inoperative position.

21. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a control for starting and stopping operation of said pump, a valve for controlling discharge of liquid from said apparatus, said valve having an arm for controlling movement thereof, an arm operable by said control for moving said first named arm to cause said valve to be closed when said control is rendered inoperative, said second named arm being inoperative to move said first arm when said valve is closed, a member movable by said reset means engageable with said first named arm when the valve is in closed position to move said arm to open said valve when said indicator is reset to zero position, and a member engageable with said second named arm when said valve is closed to urge said second arm to move said control to inoperative position, said first named arm moving said last named member to inoperative position when said valve is open.

22. In a device of the character described, the combination of liquid dispensing means, indicating means having indicia for showing the amount of liquid dispensed, reset means for said indicating means, control means for controlling flow through said liquid dispensing means, and means operable by said control means to conceal the indicia until said indicating means has been reset to a predetermined position.

23. In a device of the character described, the combination of liquid dispensing means, indicating means having indicia for showing the amount of liquid dispensed, reset means for said indicating means, control means for controlling flow through said liquid dispensing means, concealing means adapted to conceal the indicia, and means operably connected to said indicating means and said concealing means for rendering said concealing means inoperative to conceal said indicia if the control means is initiated after said indicating means has been reset to a predetermined position.

24. In a device of the character described, the combination of liquid dispensing means, indicating means having indicia for showing the amount of liquid dispensed, reset means for said indicating means, control means for controlling flow through said liquid dispensing means, concealing means operable by said control means to conceal the indicia until said indicating means has been reset to a predetermined position, and means operably connecting said reset means and said concealing means for rendering said concealing means inoperative to conceal said indicia when said reset means has moved said indicating means to said predetermined position.

25. In a device of the character described, the combination of liquid dispensing means, indicating means operated in accordance with liquid passing through said dispensing means and having indicia for showing the amount of liquid dispensed, reset means for said indicating means, control means for controlling flow through said liquid dispensing means, concealing means operable to conceal the indicia until said indicating means has been reset to a predetermined position, and means operably connecting said reset means and said concealing means for rendering said concealing means inoperative to conceal said indicia when said reset means has moved said indicating means to said predetermined position.

26. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia until said indicating means has been reset to a predetermined position, and means operably connecting said reset means and said concealing means for rendering said concealing means inoperative to conceal said indicia when said reset means has moved said indicating means to said predetermined position.

27. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia if dispensing is initiated while the indicating means is in other than a predetermined position.

28. In a device of the character described, the combination of liquid dispensing means, a meter for measuring the liquid dispensed through said dispensing means, indicating means operated in accordance with the liquid passing through said meter and having indicia for showing the amount of liquid dispensed, reset means for said indicating means, control means for controlling flow through said liquid dispensing means, concealing means operable to conceal the indicia if dispensing is initiated while the indicating means is in other than a predetermined position, and means operably connecting said reset means and said concealing means for rendering said concealing means inoperative to conceal said indicia when said reset means has moved said indicating means to said predetermined position.

29. In a fluid dispensing device, an indicator for registering the quantity of fluid dispensed, means for resetting the indicator to zero position and a shutter for concealing and exposing the indicator operatively connected to the resetting means for indicating either that the indicator has or has not been reset to zero.

30. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, a control for starting and stopping said pump, an indicator operated by the meter for showing that flow of liquid has been effected through said meter, a shutter associated with said indicator, reset means for said indicator for returning said indicator to zero position, said reset means being operatively connected to said shutter and to said control whereby operation of said control for starting said pump when the indicator is away from zero position causes said shutter to obstruct the visible registration of said indicator.

31. In a fluid dispensing device, an indicator for registering the quantity of fluid dispensed, means for resetting the indicator to zero position, and a signal device operatively connected to the resetting means for indicating either that the indicator has or has not been reset to zero position.

32. A dispensing device, comprising a fluid dispensing means, means for measuring the quantity of fluid dispensed, an indicator connected to the measuring device for registering the quantity of fluid dispensed and means for resetting the indicator to zero; in combination with a signal device movable to two positions, a control member engageable with means connected with the signal device to stop the latter in one position, said control member being displaceable to allow the signal device to move to the second position, after the indicator has been reset to zero.

33. In a fluid dispensing device, means for dispensing fluid, means for measuring the quantity of fluid dispensed, an indicator connected to the measuring means for registering the quantity of fluid dispensed, means for resetting the indicator to zero position, and signal means movable to one position if the indicator has not been reset to zero and movable to a different position only after the indicator has been reset to zero.

34. In a fluid dispensing device, means for dispensing fluid, means for measuring the quantity of fluid dispensed, an indicator connected to the measuring means for registering the quantity of fluid dispensed, a signal device movable to two positions, one indicating that the indicator has not been reset to zero position, and the other indicating that the indicator has been reset to zero, and means for resetting the indicator to zero position, said signal device being movable to said other position only after the indicator has been reset to zero.

35. In a liquid dispensing apparatus, the combination of an indicator for registering the dispensing of liquid from said apparatus, a shutter disposed adjacent said indicator, means for resetting the indicator and moving said shutter, said shutter being movable to open position to expose said indicator and to closed position to conceal said indicator, said shutter being in closed position when the indicator is being reset and remaining in said closed position until the indicator is moved to a predetermined position.

36. In a device of the character described, the combination of liquid dispensing means, indicating means having indicia for showing that liquid has been dispensed, reset means for said indicating means, control means for controlling flow through said liquid dispensing means, and means moved to open and closed positions to reveal and conceal said indicia, the last named means remaining closed until the indicia are moved to a predetermined position and then being moved to open position.

37. In a device of the character described, the combination of liquid dispensing means, indicating means having indicia for showing that liquid has been dispensed, reset means for said indicating means, control means for controlling flow through said liquid dispensing means, shutter means adapted to be moved to open and closed positions to reveal and conceal said indicia, mechanism interposed between said reset means and shutter means for maintaining said shutter means closed while said reset means is being operated to reset said indicia, said shutter means remaining closed until said indicia has been moved to a predetermined position and then being moved to open position.

38. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a valve in said outlet pipe operated to open position by the reset means at the time the indicator is reset to a predetermined position, and control means for controlling dispensing operation, said control means being operable to close said valve.

39. In liquid dispensing apparatus, the combination of a pump the suction side of which is adapted to be associated with a source of liquid supply, a meter the inlet side of which is connected to the outlet side of said pump, an outlet pipe from said meter, a discharge hose connected to said outlet pipe, an indicator operated by said meter for showing measurement of liquid by said meter, reset means for said indicator, a valve in said outlet pipe operable to open and closed positions to permit and prevent dispensing of liquid, means between said valve and indicator to prevent said valve being opened unless said indicator has been moved to a predetermined position after a previous completed dispensing operation, and control means associated with said valve for moving said valve to closed position.

ROSS H. ARNOLD.
WILLIAM G. POLHAMUS.
HOWARD SOMERVELL.